United States Patent [19]

Kawagoe et al.

[11] Patent Number: 4,936,604
[45] Date of Patent: Jun. 26, 1990

[54] VEHICULAR HEIGHT CONTROL SYSTEM FOR AUTOMOTIVE SUSPENSION SYSTEM WITH IMPROVED HEIGHT CONTROL CHARACTERISTICS ON UNDULATED ROAD AND/OR ROUGH ROAD

[75] Inventors: Kenji Kawagoe; Hideo Ito; Masatsugu Yokote, all of Kanagawa, Japan

[73] Assignee: Nissan Motor Company, Limited, Yokohama, Japan

[21] Appl. No.: 183,158

[22] Filed: Apr. 19, 1988

[51] Int. Cl.⁵ .............................................. B60G 17/00
[52] U.S. Cl. ..................................... 280/840; 280/707; 364/424.05
[58] Field of Search ................. 280/707, 708, DIG. 1, 280/6 H, 6 R, 6.1, 702, 6.12, 840; 364/424, 424.05

[56] References Cited

U.S. PATENT DOCUMENTS

| | | |
|---|---|---|
| 2,921,160 | 1/1960 | Lautzenhiser ................. 280/DIG. 1 |
| 3,127,189 | 3/1964 | Schultz et al. ................. 280/DIG. 1 |
| 4,162,083 | 7/1979 | Zabler et al. .......................... 280/707 |
| 4,436,318 | 3/1984 | Ichikawa et al. ..................... 280/104 |
| 4,616,846 | 10/1986 | Furuya et al. ........................ 280/707 |
| 4,630,226 | 12/1986 | Tanaka .................................. 364/561 |
| 4,647,069 | 3/1987 | Iijima ................................... 280/707 |
| 4,648,622 | 3/1987 | Wada et al. ........................... 280/707 |
| 4,659,104 | 4/1987 | Tanaka et al. ........................ 280/707 |
| 4,674,767 | 6/1987 | Kuroki et al. ................. 280/DIG. 1 |
| 4,677,599 | 6/1987 | Obayashi et al. ........................ 367/99 |
| 4,685,689 | 8/1987 | Takizawa et al. .................... 280/707 |
| 4,686,626 | 8/1987 | Kuroki et al. ......................... 364/426 |
| 4,699,507 | 10/1987 | Etoh ............................................ 356/5 |
| 4,717,172 | 1/1988 | Asami et al. .......................... 280/707 |
| 4,718,695 | 1/1988 | Kawagoe ............................... 280/707 |
| 4,722,547 | 2/1988 | Kishi et al. ............................ 280/707 |

FOREIGN PATENT DOCUMENTS 0114680 8/1984 European Pat. Off. .
0114700 8/1984 European Pat. Off. .

*Primary Examiner*—Charles A. Marmor
*Assistant Examiner*—Karin Tyson
*Attorney, Agent, or Firm*—Foley & Lardner, Schwartz, Jeffery, Schwaab, Mack, Blumenthal & Evans

[57] ABSTRACT

A vehicular height control system includes means for detecting road roughness condition on the basis of a vehicular height indicative signal which is produced by a vehicular height sensor. The control system also includes means for detecting the road roughness condition satisfying a predetermined condition for disabling vehicular height control. Disabling of vehicular height control keeps the control system free from fluctuation of vehicular height indicative signal value due to uneveness of the road surface.

21 Claims, 4 Drawing Sheets

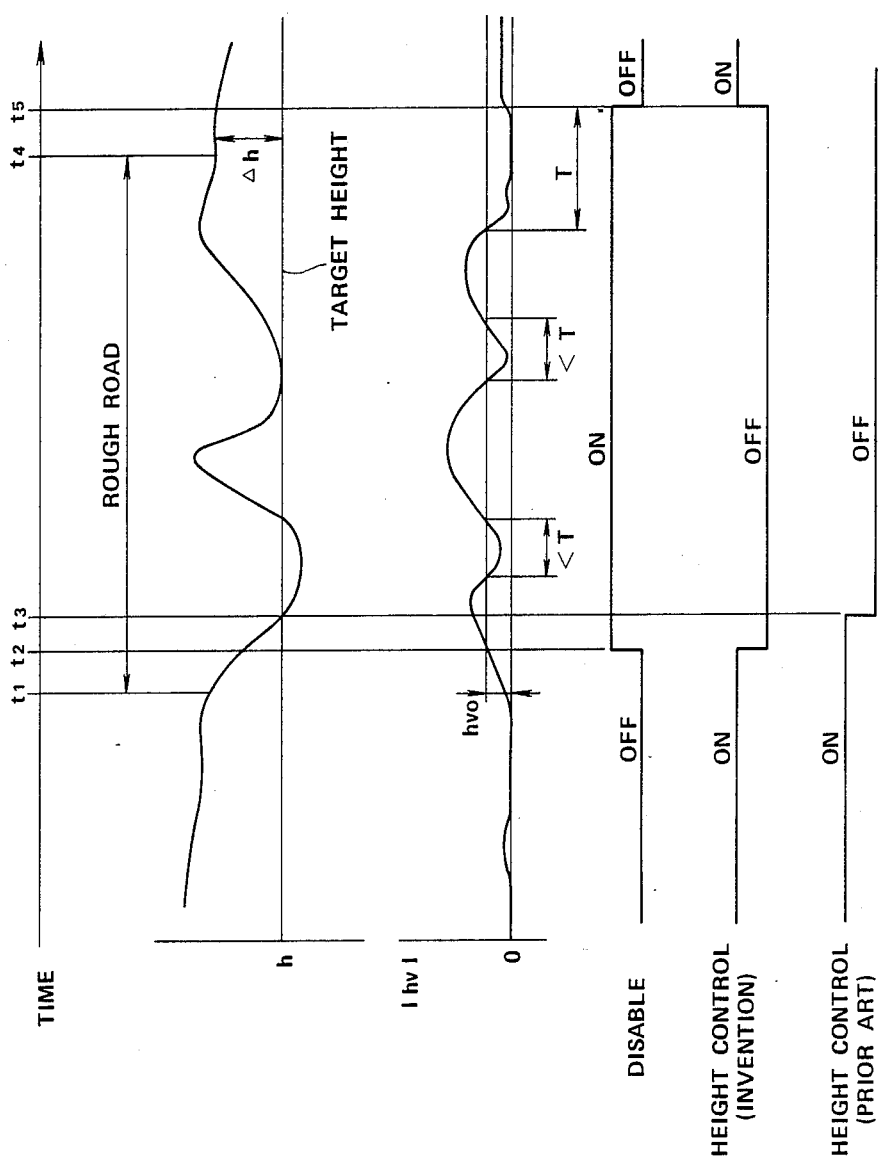

VEHICULAR HEIGHT CONTROL SYSTEM FOR AUTOMOTIVE SUSPENSION SYSTEM WITH IMPROVED HEIGHT CONTROL CHARACTERISTICS ON UNDULATED ROAD AND/OR ROUGH ROAD

BACKGROUND OF THE INVENTION

1. Field of the Invention

The present invention relates generally to a vehicular height control system for an automotive suspension system for adjusting or regulating height level of various portions of a vehicle body and whereby for regulating vehicle body attitude. More specifically, the invention relates to a vehicular height control system which is provided an improved control characteristics during travel through an undulated road and/or rough road which may cause bottoming at one or more suspension systems of the vehicle.

2. Description of the Background Art

Conventionally, various vehicular height regulating or controlling systems have been developed and proposed. These conventional vehicular height control systems are designed for controlling height level of the vehicle body at various portions thereof so that attitude of the vehicle bodies can be regulated at various vehicle driving condition for providing better drivability and riding comfort. For example, one of the typical construction of vehicular height control system has been disclosed in the Japanese Patent First Publication (Tokkai) Showa No. 53-51823. The disclosed vehicular height control system includes a feature of disabling height adjustment in preselected vehicular driving condition, such as during braking and acceleration or deceleration in which vehicular pitching motion is expected and during turning in which vehicular rolling is expected. In this system, it is intended to avoid the system to fall into in acurately height adjusting condition due to abrupt change of vehicular attitude. This system is successful in preventing the vehicular height control system from inacurately controlling the vehicular height in a vehicle condition in which vehicular pitching or rolling motion occurs.

However, the prior proposed system does not concern about the vehicular attitude change due to road surface condition. For instance, on an undulated load or substantially rough road, the vehicular attitude changes due to uneveness of the road surface. When the magnitude of undulation on the road surface is substantial, the vehicle attitude may change substantially to cause vehicular height control operation. However, since vehicular height frequently changes on the undulated or rough road, precise height adjustment cannot be expected. Furthermore, due to frequent change of directions, i.e. rising direction and lowering direction, of height adjustment, the height adjustment tends to be terminated at inaccurate height level. This clearly degrades riding comfort and drivability of the vehicle.

SUMMARY OF THE INVENTION

Therefore, it is an object of the invention to provide a vehicular height control system which has improved control characteristics while a vehicle travels along an undulated road or rough road.

Another and more specific object of the invention is to provide a vehicular height control system normally perform height control for adjusting the vehicular height level at a predetermined target height. The control system can avoid influence of road surface roughness for precise height control.

In order to accomplish aforementioned and other objects, a vehicular height control system, according to the invention, includes means for detecting road rougness condition on the basis of a vehicular height indicative signal which is produced by a vehicular height sensor. The control system also includes means for detecting the road roughness condition satisfying a predetermined condition for disabling vehicular height control. Disabling of vehicular height control keeps the control system free from fluctuation of vehicular height indicative signal value due to uneveness of the road surface.

According to one aspect of the invention, a height control system for an automotive suspension system comprises a suspension system disposed between a vehicle body and a suspension member rotatably supporting a road wheel, the suspension system including means for varying suspension force to be exerted between the vehicle body and the suspension member, a first sensor monitoring a vehicular height for producing a height indicative sensor signal, a controlling means for receiving the sensor signal, and checking the value of the sensor signal with respect to a predetermined target height range indicative values for deriving a control signal to operate the varying means to adjust the suspension force for maintaining the vehicular height within the target height range, and a disabling means for discriminating road surface condition on the basis of the sensor signal and disabling operation of the controller means when the discriminated road surface condition satisfies a predetermined disabling condition.

According to another aspect of the invention. a height control system for an automotive suspension system comprises a suspension system disposed between a vehicle body and a suspension member rotatably supporting a road wheel, the suspension system including means for varying suspension force to be exerted between the vehicle body and the suspension member, a first sensor monitoring a vehicular height for producing a height indicative sensor signal, a controlling means for receiving the sensor signal, and checking the value of the sensor signal with respect to a predetermined target height range indicative values for deriving a control signal to operate the varying means to adjust the suspension force for maintaining the vehicular height within the target height range, and a disabling means for extracting signal component of the second signal representative of vehicular body vibration and whereby detecting vehicular body vibrating condition satisfying a predetermined disabling condition for disabling the controlling means.

The disabling means detects the signal component having a value representative of the vehicular body vibration, and greater than a given criterion. The disabling means includes a filter means having a pass-band corresponding to vehicular body resonation frequency to extract the signal component from the sensor signal.

The disabling means may further comprise a smoothing means for smoothing the signal component.

In the alternative, the disabling means derives variation speed of vehicular height on the basis of the sensor signal and detects vehicular height variation speed higher than a vehicular height variation speed criterion to disable the controller means. The disabling means is responsive to the vehicular height variation speed higher than the vehicular height variation speed criterion to disable the controller means for a given period of time.

BRIEF DESCRIPTION OF THE DRAWINGS

In the drawings:

FIG. 4 is a chart showing height adjustment operation during travel on a rough road where bottoming of suspension systems will occur.

DESCRIPTION OF THE PREFERRED EMBODIMENT

Figure 1:
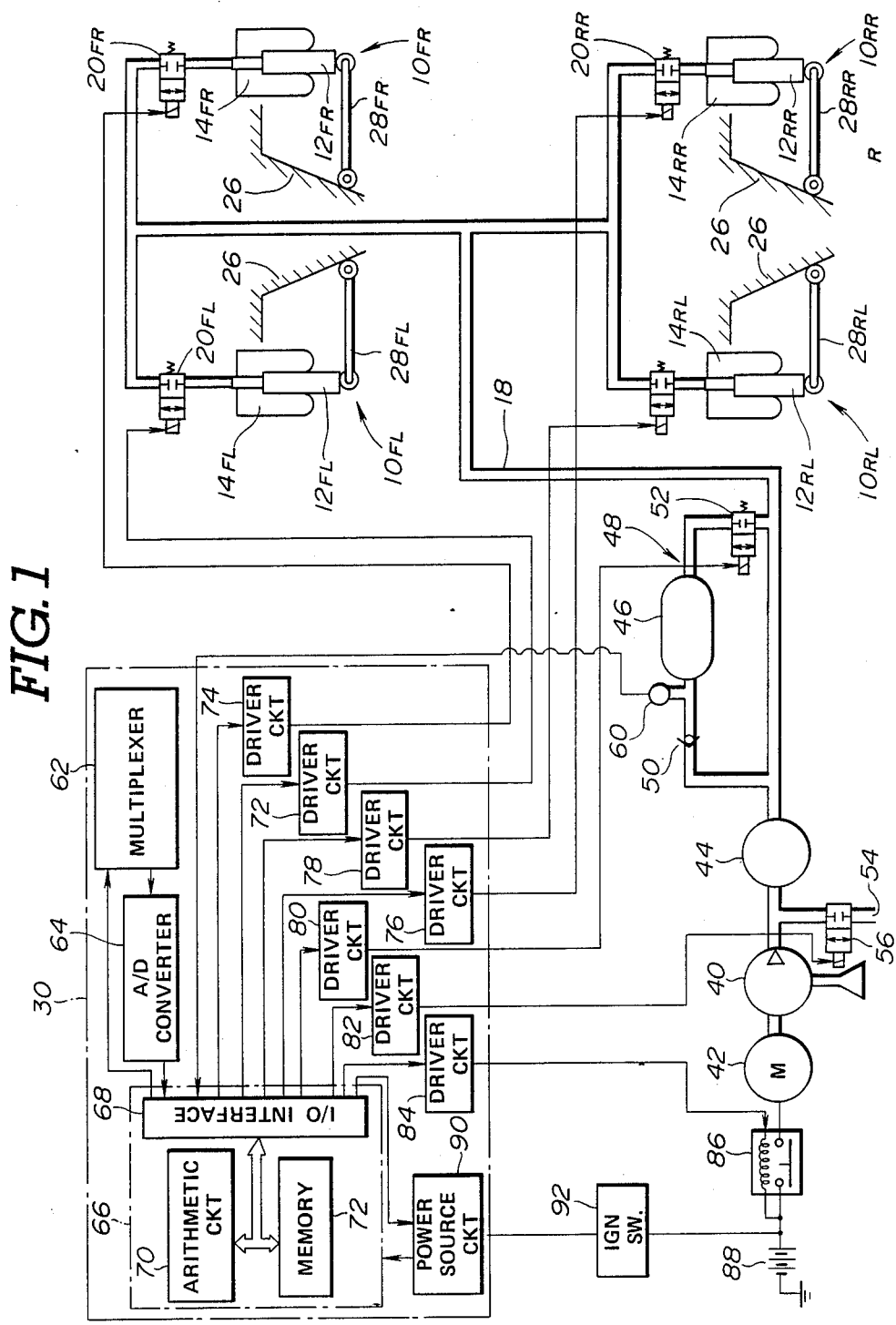
FIG. 1 is a block diagram of the preferred embodiment of a height control system in an automotive suspension system, according to the present invention.

Referring now to the drawings, particularly to FIG. 1, the preferred embodiment of a height control system in an automotive suspension system, according to the present invention, employs suspension system $10_{FL}$, $10_{FR}$, $10_{RL}$ and $10_{RR}$ for rotatably supporting front-left, front-right, rear-left and rear-right vehicular wheels. The suspension systems $10_{FL}$, $10_{FR}$, $10_{RL}$ and $10_{RR}$ include suspension struts $12_{FL}$, $12_{FR}$, $12_{RL}$ and $12_{RR}$ which include shock absorbers and height control actuator means $14_{FL}$, $14_{FR}$, $14_{RL}$ and $14_{RR}$.

The actuator means $14_{FL}$, $14_{FR}$, $14_{RL}$ and $14_{RR}$ generally comprise pressure chambers filled with a working fluid. In the preferred embodiment, the pressure chambers $14_{FL}$, $14_{FR}$, $14_{RL}$ and $14_{RR}$ are filled with gas, such as an air. Each of the pressure chambers $14_{FL}$, $14_{FR}$, $14_{RL}$ and $14_{RR}$ is connected to a pressurized air source 16 via pressure supply system 18. Height control valve means $20_{FL}$, $20_{FR}$, $20_{RL}$ and $20_{RR}$ are disposed within the pressure supply system 18 for controlling air pressure to be supplied for respectively corresponding pressure chambers $14_{FL}$, $14_{FR}$, $14_{RL}$ and $14_{RR}$. As seen from FIG. 1, the height control valve means $20_R$ is designed for commonly adjusting the air pressure in the pressure chambers $14_{RL}$, $14_{RR}$ of the rear suspension systems $10_{RL}$ and $10_{RR}$.

A vehicular height sensor 24 is provided at position suitable for monitoring the vehicular height level. It should be appreciated that the shown embodiment employs a sole vehicular height sensor for monitoring the vehicular height variation, it may be possible to employ a plurality of vehicular height sensors for monitoring the vehicular height at various portion of the vehicular body. In such case, the vehicular height sensors may be provided at positions where the suspension systems are provided.

The vehicular height sensor 24 used as sole sensor for monitoring the vehicular height variation, may comprise an ultra-sonic sensor such as that disclosed in the U.S. Pat. No. 4,686,626, issued on Aug. 11, 1987, to Junsuke Kuroki et al, the U.S. Pat. No. 4,630,226, issued on Dec. 16, 1986, to Haruto Tanaka, the U.S. Pat. No. 4,699,507, issued on Oct. 13, 1987, to Yoshiyuki Etoh, the U.S. Pat. No. 4,677,599, issued on Jun. 30, 1987, to Hiroaki Okabayashi et al. and the U.S. Pat. No. 4,722,547, issued on Jan. 26, 1988, to Terui Kishi et al. all of which are assigned to the common assignee to the present invention. In the alternative, the vehicular height sensor may comprise an accelerometer such as that disclosed in the co-pending U.S. Pat. application Ser. No. 120,964, filed on Nov. 16, 1987, assigned to the common assignee tot he present invention. In further alternative, a mechanical vehicular height detector has been disclosed in the U.S. Pat. No. 4,436,318, issued on Mar. 13, 1984, which is also assigned to the common assignee to the present invention. In case that the vehicular height sensors 24 are used in plural to monitor relative distance between associated portions of the vehicle body and the corresponding suspension member, the vehicular height sensor may comprise a stroke sensor.

The disclosures in the above-identified references will be herein incorporated by reference for the sake of disclosure.

The vehicular height sensor 24 produces a vehicle height indicative signal $S_H$ having a value variable depending on the monitored vehicular height level. The vehicular height indicative signal $S_H$ is fed to a controller 30.

The controller 30 includes a discriminator stage and a control signal generator stage. The vehicle height indicative signal $S_H$ is input to the discriminator stage of the controller 30. In the discriminator stage, the vehicle height indicative signal $S_H$ is compared with a maximum height indicative upper criterion $H_U$ and a minimum height indicative lower criterion $H_L$ to discriminate whether the vehicle height as represented by the vehicle height indicative signal is within a target height range defined by the upper and lower criteria $H_U$ and $H_L$.

When the vehicle height level out of the target height range, the control signal generator stage is triggered for operation. In response to initiation of the operation of the control signal generator stage, a communication valve control signal is, at first, output to the communication valve 22 to open the latter. In response to the height control signal of the control signal generator stage, respective height control valve means $20_{FL}$, $20_{FR}$, $20_{RL}$ and $20_{RR}$ are operated to adjust the vehicle height level at respectively corresponding wheel positions to be within the target height range.

As shown in FIG. 1, the air source 16 comprises a compressed air supply network including a motor driven compressor 40 which is associated with an electric motor 42 to be driven by the driving force transmitted therefrom. The compressor 40 is connected to the pressure supply passage system 18. An air dryer 44 is disposed in the pressure supply passage system 18 and downstream of the compressor for drying the air fed from the compressor. In addition, a pressure accumulator 46 is provided in a pressure accumulation system 48 which is in communication with the pressure supply passage system 18 at both ends. A one-way check valve 50 is provided in the pressure accumulation system 48 and upstream of the pressure accumulator 46. An electromagnetically actuated pressure accumulation control valve 52 is provided downstream of the pressure accumulator 46.

The pressure supply passage system 18 includes a ventilation port 54, at which a ventilation control valve 56 is provided for opening and closing the port.

As seen from FIG. 1, the height control valves means $20_{FL}$, $20_{FR}$, $20_{RL}$ and $20_{RR}$ comprise electromagnetically actuated valves. The height control valves $20_{FL}$, $20_{FR}$, $20_{RL}$ and $20_{RR}$, the pressure accumulation control valve 52 and the ventilation control valve are respectively connected to the controller 30 to be controlled respective valve positions. The height control valves $20_{FL}$, $20_{FR}$, $20_{RL}$ and $20_{RR}$, employed in the shown embodiment, are so designed as to open while they are activated, to establish communication between the pressure chambers $14_{FL}$, $14_{FR}$, $14_{RL}$ and $14_{RR}$ and the pressure supply passage system 18 and to close while they are deactivated, to block the communication. The accumulation control valve 52 is so designed as to be activated to open for establishing communication between the pressure accumulator 46 and the pressure supply passage means 16 and to be deactivated to close for blocking the communication. The ventilation control valve 56 is designed to be activated to open the valve for exposing the pressure supply passage means 16 to the atmosphere for ventilation of the pressurized air through the ventilation port 54 and to be deactivated to shut the valve.

In order to monitor the pressure accumulated on the pressure accumulator 46, a pressure sensor 60 is provided. The pressure sensor 60 is designed for generating an accumulated pressure indicative signal to be input to the controller 30 as a compressor control parameter.

The controller 30 comprises a microprocessor 66 having an input/output interface 68, an arithmetic circuit 70, such as CPU, and a memory 72, such as ROM, RAM, register and so forth. The input/output interface 68 is connected to the A/D converter to receive one of the height indicative signals from the vehicular height sensor 24.

The input/output interface 68 is also connected to driver circuits 72, 74, 76, 78, 80, 82, to feed thereto control signals. The driver circuits, 72, 74, 76 and 78 are respectively connected to the height control valves $20_{FL}$, $20_{FR}$, $2O_{RL}$ and $20_{RR}$ to feed thereto height control driver signals. The driver circuits 72, 74, 76 and 78 output HIGH level height control driver signals when the height level of respectively corresponding vehicle body portions is out of the target height range and, otherwise, output LOW level height control driver signals. Therefore, the height control valves $20_{FL}$, $20_{FR}$, $20_{RL}$ and $20_{RR}$ are responsive to the HIGH level height control signal to be activated and to the LOW level height control signal to be deactivated. Furthermore, the driver circuit 80 is connected to the pressure accumulation control valve 52 to feed a HIGH level accumulator control signal to open the latter for establishing communication between the pressure accumulator 46 and the pressure supply system 18 and to feed a LOW level accumulator control signal to close the latter for blocking the communication.

The driver circuit 82 is connected to the ventilation control valve 56 to open in order to expose the pressure supply system 18 to the atmosphere by HIGH level ventilation control signal and to shut for closing the pressure supply system.

In addition, the microprocessor 66 detects the pressure in the pressure accumulator 46 dropping lower than a predetermined pressure to generate a compressor control signal. The compressor control signal is fed to a driver circuit 84 via the input/output interface 68. The driver circuit 84 is connected to a power supply control relay 86 which establishes and blocks electric connection between the electric motor 42 and a vehicular battery 88. In response to the compressor control signal, the driver circuit 84 produces a compressor drive signal for energizing the power supply control relay 86 for establishing electric connection between the battery 88 and the motor 42 to drive the motor. As a result, the compressor 40 is driven by the driving force of the motor 42 to supply the pressure to the pressure accumulator 46.

The operation of the preferred embodiment of the vehicle height control system set forth above will be discussed herebelow with reference to FIG. 2, in which is shown a routine for discriminating the road surface condition and whereby detecting height control disabling condition, on the basis of the vehicular height indicative signal.

It should be noted though it is not illustrated, that the shown vehicular height control system perform normal state height control operation. In general, the height control is performed to adjust the vehicular height within a predetermined target height range defined by an upper height criterion and a lower height criterion. When the vehicular height indicative signal value is smaller than the lower height criterion, UP command is generated to initiate up-control to raise the vehicular height. On the other hand, when the vehicular height indicative signal value is greater than the upper height criterion, DOWN command is generated to trigger down-control to lower the vehicular height.

In the practical down-control operation, DOWN command is produced. The microprocessor 66 is responsive to this DOWN command to output control signal to the ventilation control signal to open the ventilation control valve 56 to operate the latter into open position. Also, control signal is fed to one of the height control valves $20_{FL}$, $20_{FR}$, $2O_{RL}$ and $20_{RR}$ to open to reduce the fluid pressure in corresponding one of the pressure chambers $14_{FL}$, $14_{FR}$, $14_{RL}$ and $14_{RR}$. Therefore, the fluid pressure in the corresponding one of pressure chamber $14_{FL}$, $14_{FR}$, $14_{RL}$ and $14_{RR}$ is reduced to reduce the suspension force to support the vehicle body on the suspension member. Therefore, the vehicle body height relative to the suspension member is lowered.

On the other hand, in up-control operation, UP command is issued. The microprocessor 66 is responsive to the UP command to check the pressure in the pressure accumulator 46. When the pressure in the pressure accumulator 46 is sufficiently high to increase the pressure in the corresponding one of pressure chamber $14_{FL}$, $14_{FR}$, $14_{RL}$ and $14_{RR}$, the control signal is fed to the accumulation control valve 52 to open. On the other hand, when the fluid pressure in the pressure accumulator 46 is not sufficient, the microprocessor 66 outputs HIGH level control signal to the relay 86 to drive the pump motor 42 to drive compressor 40. Simultaneously, HIGH level control signals are fed to corresponding one of the height control valves $20_{FL}$, $20_{FR}$, $20_{RL}$ and $20_{RR}$. By this, the fluid pressure in the corresponding one of the pressure chambers $14_{FL}$, $14_{FR}$, $14_{RL}$ and $14_{RR}$ is increased to increase the suspension force supporting the vehicle body on the suspension member. Consequently, the vehicle body height relative to the suspension member is rised.

In addition to the aforementioned vehicular height dependent height adjustment, vehicular driving condition dependent vehicular height control may be performed with taking various vehicular height adjusting parameters. For example, the vehicular height control depending upon the vehicle driving condition, has been disclosed in the following patents and co-pending applications, listed herebelow.

U.S. Pat. No. 4,519,169

European Patent First Publication No. 01 14 680
European Patent First Publication No. 01 14 700
U.S. Pat. No. 4,659,104
U.S. Pat. No. 4,718,695
U.S. Ser. No. 906,239, filed on Sep. 12, 1986
U.S. Pat. No. 4,827,416
U.S. Ser. No. 056,761, filed on Jun. 2, 1987
U.S. Pat. No. 4,800,751
German Patent First Publication No. 37 15 441
U.S. Ser. No. 120,964, filed on Nov. 16, 1987.

Figure 2:
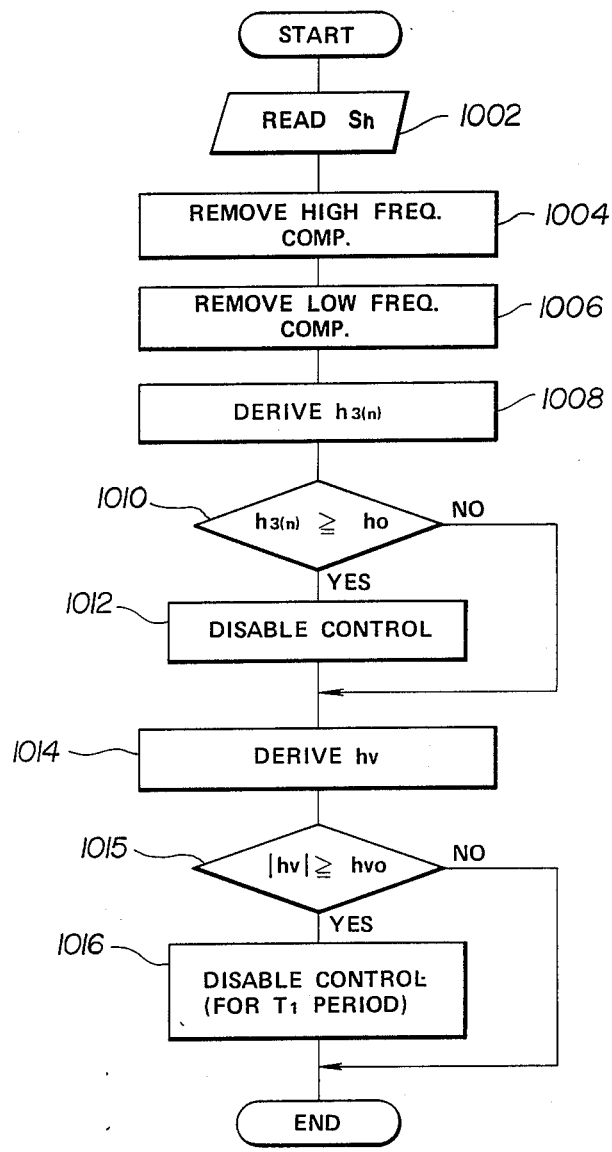
FIG. 2 is a flowchart showing a routine for discriminating a road surface condition and detecting height adjustment disabling condition on the basis of a vehicular height indicative signal value.

In the process of discrimination of the road surface condition illustrated in FIG. 2, the vehicular height indicative signal $S_H$ is read at a step 1002. The read vehicular height indicative signal $S_H$ is processed by a recirculation type digital low-pass filter provided a cut-off frequency of $f_1$ in order to remove the high frequency component above the cut-off frequency $f_1$, at a step 1004. By this, a high frequency removed vehicular high indicative signal $h_1$ can be obtained. Subsequently, the high frequency component removed vehicular height indicative signal $h_1$ is processed by a recirculation type digital high-pass filter provided cut-off frequency $f_2$ in order to remove the low frequency component below the cut-off frequency $f_2$ at a step 1006. By this, the high and low frequency component removed vehicular height indicative signal $h_2$ can be obtained.

Here, the cut-off frequency $f_1$ of the low-pass filter is set at a frequency corresponding to possible highest frequency of a vehicular body resonation frequency range. On the other hand, the cut-off frequency $f_2$ of the high-pass filter is set at a frequency corresponding to possible lowest frequency of a vehicular body resonation frequency range.

Therefore, by passing the vehicular height indicative signal through the low-pass and high-pass filters, the frequency component $f_0(f_2 < f_0 < f_1)$, range, can be extracted. Therefore, the high and low frequency component removed vehicular height indicative signal $h_2$ will be hereafter referred to as resonant range vehicular height indicative signal $h_2$.

The digital low-pass filter is programmed in the controller 30 according to the following logic utilizing a secontary Butterworth filter. The a secondary Butterworth filter has a transfer coefficient illustrated by:

$$H(s) = \Omega_c 2/(s^2 + /2\Omega_c s + \Omega_c 2)$$

By primary conversion of the foregoing equation, the following equation can be obtained:

$$H(z) = (b_0 + b_1 z^{-1} + b_2 z^{-2})/(1 + a_1 z^{-1} + a_2 z^{-2}) \quad (1)$$

wherein the parameters are:

$$a_1 = \{2(\gamma^2 - 1)\}/(\gamma^2 + /2\gamma + 1)$$

$$a_2 = (\gamma^2 - /2\gamma + 1)/(\gamma^2 + /2\gamma + 1)$$

$$b_0 = b_2 = \gamma^2/(\gamma^2 + /2\gamma + 1)$$

$$b_1 = 2b_0$$

$$\gamma = \Omega_c T/2$$

Here, it is assumed that the cut-off frequency $f_1$ is 4 Hz and sampling frequency T is 0.1 ms, $\Omega_c$ can be illustrated by:

$$\Omega_c = 2\pi \times 4 \text{ [rad/sec]}$$

Therefore, $$a_1 = 0.265$$

$$a_2 = 0.184$$

$$b_0 = b_2 = 0.362$$

$$b_1 = 0.725$$

are obtained.

From the above, the following equation can be established:

$$h/h_1 = (b_0 + b_1 z^{-1} + b_2 z^{-2})/(1 + a_1 z^{-1} + a_2 z^{-2}) \quad (2)$$

The foregoing equation (2) can be mofified as follow:

$$h(n) = B_0 h_1(n) + b_1 h_1(n-1) + b_2 h_1(n-2) - a_1 h(n-1) - a_2 h_2(n-1) \quad (3)$$

By this, the recirculation type digital low-pass filter defined by the foregoing equation (3) can be obtained.

On the other hand, the recirculation type digital high-pass filter can be obtained by modifying the foregoing equation (2) by the following formula:

$$Z^{-1} -- -(z-1 -\cos \Omega c)/(1 + \cos \Omega c + Z^{-1})$$

At a step 1008, the vehicular height indicative signal past the digital low-pass and high-pass filters is further processed with a preselected coefficient $\alpha$ to derive a running average $h_3$ of absolute value of the ($|h_2|$) of the resonant frequency vehicular height indicative signal by the following equation:

$$h_3(n) = (1 - \alpha)H_3 + \alpha |h_2|$$

By the process at the step 1008, a smoothed vehicular height indicative signal $h_3(n)$ can be obtained. This smoothed vehicular height indicative signal $h_3(n)$ represents magnitude of vehicular body resonation for vertical displacement.

Then, the value of the smoothed vehicular height indicative signal $h_3(n)$ is compared with a predetermined reference value $h_0$, at a step 1010. The reference value $h_0$ serves as height adjustment criterion and is representative of maximum acceptable magnitude of resonating vibration of the vehicle body. When the smoothed vehicular height indicative signal value $h_3(n)$ is greater than or equal to the reference value, $h_0$, height adjustment is disabled, at a step 1012.

After disabling height adjustment at the step 1012 or when the smoothed vehicular height indicative signal $h_3(n)$ is smaller than the reference value $h_0$, the instantaneous vehicular height indicative signal value h as read at the step 1002, is compared with a vehicle height indicative signal value stored 100 ms before which will be hereafter referred to as former vehicular height data, at a step 1014. At the step 1014, a difference of the vehicular height indicative signal read at the step 1002 and the former vehicular height data. In order to enable the instantaneous vehicular height indicative signal value with the vehicular height indicative signal value stored 100 ms before, the memory 72 is provided a given number of memory blocks for storing the vehicular height indicative signal value. Number of the memory block to be provided in the memory 72 will be determined depending upon the updating interval of the vehicle height indicative data.

In the shown embodiment, the memory 72 is designed to hold the vehicular height data for 100 ms and thus to update the vehicular height indicative data stored in each memory block every 100 ms. Namely, the vehicular height indicative data in each memory block is updated when the read vehicular height indicative signal value h is written in.

At the step 1014, the difference of the instantaneous vehicular height data as read at the step 1002 and the former vehicular height data is further processed to be multiplied by ten to convert into a data hv indicative of vehicular height variation speed per one sec. The absolute value $|hv|$ of the vehicular height variation speed is compared with a vehicular height variation speed reference $h_{v0}$ at stop 1015.

The vehicular height variation speed reference $h_{v0}$ represents a vehicular height variation speed criterion indicative of the acceptable maximum vehicular height variation speed for performing the vehicular height adjustment.

When the absolute value $|hv|$ of the vehicular height variation speed is greater than or equal to the vehicular height variation speed reference $h_{v0}$, the height adjustment is disabled at a step 1016. At the step 1016, a timer for measuring a predetermined period of time T is triggered. During the period of time T, the height control system is held at disabled condition.

When the absolute value $|hv|$ of the vehicular height variation speed is smaller than the vehicular height variation speed reference $h_{v0}$ as checked at the step 1015 or after disabling the height control at the step 1016, process goes END.

Figure 3:
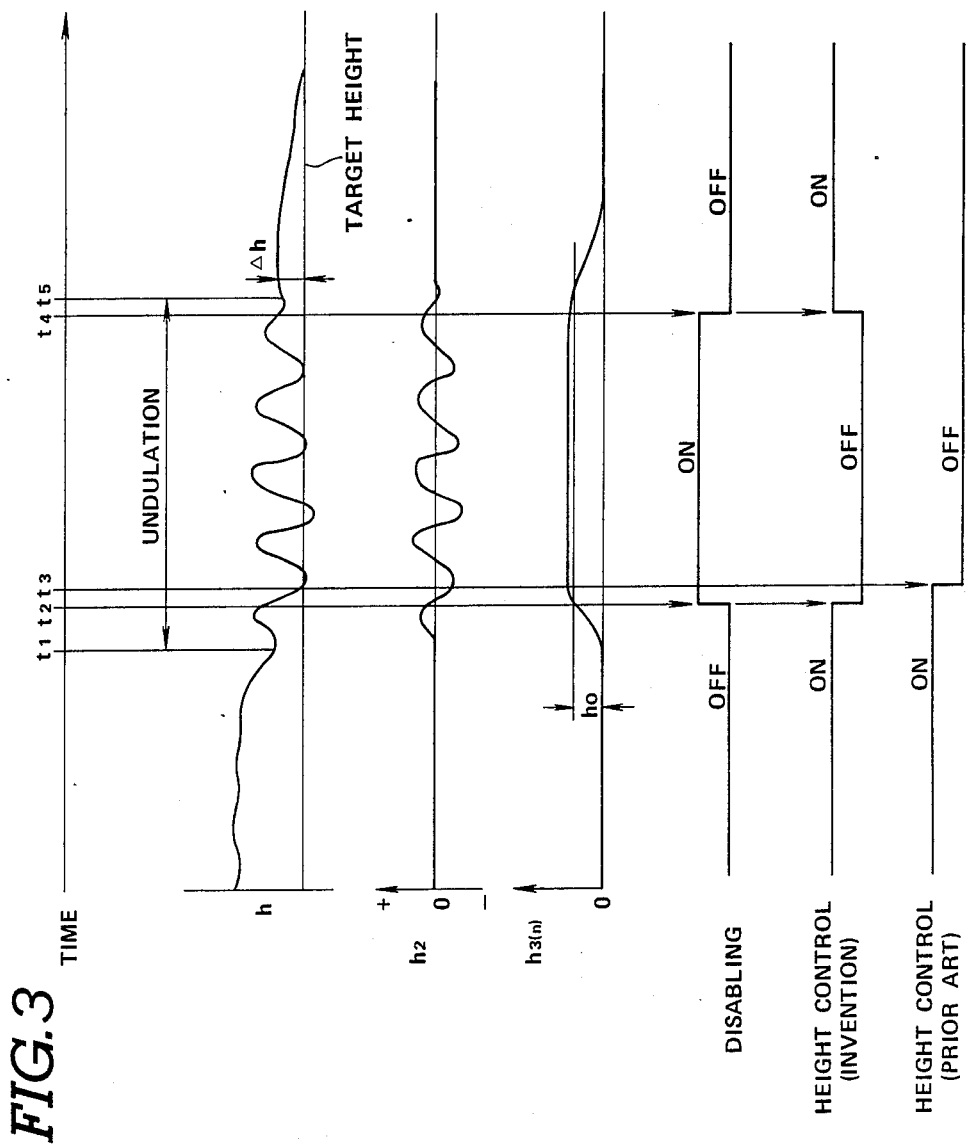
FIG. 3 is a chart showing height adjustment operation during travel on an undulated road.

FIG. 3 shows practical height control while the vehicle travels through an undulated road. In order to compare the effect of the shown embodiment of the control system, the height control operation in the conventional system will also be discussed.

In the shown example, the vehicle passes through the undulated road during the period from $t_1$ to $t_5$. In addition, it is assumed that the vehicular height adjustment is active at the time $t_1$ to lower the vehicular height. The conventional system is responsive to the vehicular height variation across the target height at the time $t_3$ to terminate height adjustment. Since the vehicular height variation is caused due to undulation of the road surface, the vehicular height is held different from the target height in a height difference magnitude $\Delta h$ as shown. However, in case that the vehicular height difference from the target height is held within the target height range, height adjustment will never be recognized by the vehicular height control system. This degrades accuracy in height adjustment.

On the other hand, in case of the shown embodiment, the vehicular height control is terminated at the time $t_2$ at which the smoothed vehicular height indicative signal value $h_3(n)$ varies to be greater than the reference value $h_0$. The vehicular height control system is held disabled until the time $t_4$ at which the smoothed vehicular height indicative signal value $h_3(n)$ decreases across the reference value $h_0$. Therefore, the vehicle height control is resumed at the time $t_4$ to re-start height adjustment. By this vehicular height can be adjusted to the target height to reduce the height difference $\Delta h$. Thus, the present invention can improve accuracy of height control when the vehicle travels through the undulated road.

FIG. 4 shows practical operation of the shown embodiment during travel through the rough road. Similarly to the former example, in order for better understanding of the advantage of the invention, the operation of the conventional system will also discussed.

Similarly to the former example, it is assumed that the vehicular height is held higher than the target height to require height adjustment. Therefore, before a time $t_{11}$, height control is active for lowering the vehicular height. The conventional system is responsive to the vehicular height variation due to roughness of the road surface to be lowered across the target height at a time $t_{13}$ to terminate height adjustment. As seen from FIG. 4, since the vehicular height matching the target height occurs due to roughness of the road at the time $t_3$, the actual vehicular height is still held higher than the target height with a height difference $\Delta h$. Therefore, the vehicular height cannot be adjusted to the target height.

On the other hand, in the shown embodiment, the height control system detects the vehicular height variation speed $|hv|$ higher than the vehicular height variation reference $h_{v0}$, at a time $t_{12}$, the height control system is disabled. As will be seen, even when the vehicular height variation speed $|hv|$ is temporarily lowered across the vehicular height variation reference $h_{v0}$, the height control system is held in the disabled condition because the timer is held active.

The vehicular height control is resumed when the vehicular height variation speed $|hv|$ is temporarily lowered across the vehicular height variation reference $h_{v0}$ for a period longer than the period of time T, the vehicular height control is resumed to maintain height adjustment for reducing the height difference $\Delta h$ between the $|hv|$ higher than the vehicular height variation reference $h_{v0}$ and the vehicular height variation reference $h_{v0}$.

As will be appreciated herefrom, since the vehicular height control system is successful in avoiding influence of the undulation of roughness of the road surface, the accuracy in height adjustment of the vehicular suspension system can be substantially improved.

Therefore, the invention fulfills the objects and advantages sought therefor.

What is claimed is:

1. A height control system for an automotive suspension system comprising:
   a suspension system disposed between a vehicle body and a suspension member rotatably supporting a road wheel, said suspension system including means for varying suspension force to be exerted between said vehicle body and said suspension member;
   a first sensor monitoring a vehicular height for producing a height indicative sensor signal;
   a controlling means for receiving said sensor signal, and checking the value of said sensor signal with respect to predetermined target height range indicative values for deriving a control signal to operate said varying means to adjust said suspension force for maintaining said vehicular height within said target height range; and
   a disabling means for discriminating road surface condition on the basis of said sensor signal and disabling operation of said controller means when the discriminated road surface condition satisfies a predetermined disabling condition.

2. A height control system as set forth in claim 1, wherein said disabling means detects a signal component contained in said sensor signal, said signal component being representative of vehicular body vibration, and whereby detects undulation on a round surface causing vehicular body vibration in a magnitude greater than a given vibration magnitude criterion.

3. A height control system as set forth in claim 2, wherein said disabling means includes a filter means having a pass-band corresponding to a vehicular body resonant frequency to detect said signal component.

4. A height control system as set forth in claim 2, wherein said disabling means further comprises a smoothing means for smoothing said sensor signal value.

5. A height control system as set forth in claim 1, wherein said disabling means derives a variation speed of vehicular height to detect road roughness causing vehicular height variation at a speed higher than a vehicular height variation speed criterion to disable said controller means.

6. A height control system as set forth in claim 5, wherein said disabling means is responsive to a vehicular height variation speed higher than said vehicular height variation speed criterion to disable said controller means for a given period of time.

7. A height control system as set forth in claim 6, wherein said disabling means includes a filter means having a pass-band corresponding to vehicular body resonant frequency to detect said signal component.

8. A height control system for an automotive suspension system comprising:
a suspension system disposed between a vehicle body and a suspension member rotatably supporting a road wheel, said suspension system including means for varying suspension force to be exerted between said vehicle body and said suspension member;
a first sensor monitoring a vehicular height for producing a height indicative sensor signal;
a controlling means for receiving said sensor signal, and checking a value of said sensor signal with respect to predetermined target height range indicative values for deriving a control signal to operate said varying means to adjust said suspension force for maintaining said vehicular height within said target height range; and
a disabling means for extracting a signal component of said second signal representative of vehicular body vibration thereby detecting a vehicular body vibrating condition satisfying a predetermined disabling condition for disabling said controlling means.

9. A height control system as set forth in claim 8, wherein said disabling means detects said signal component having a value representative of the vehicular body vibration, and greater than a given criterion.

10. A height control system as set forth in claim 9, wherein said disabling means includes a filter means having a pass-band corresponding to a vehicular body resonant frequency to extract said signal component from said sensor signal.

11. A height control system as set forth in claim 9, wherein said disabling means further comprises a smoothing means for smoothing said signal component.

12. A height control system as set forth in claim 8, wherein said disabling means derives a variation speed of vehicular height on the basis of said sensor signal and detects vehicular height variation speed higher than a vehicular height variation speed criterion to disable said controller means.

13. A height control system as set forth in claim 12, wherein said disabling means is responsive to the vehicular height variation speed higher than said vehicular height variation speed criterion to disable said controller means for a given period of time.

14. A height control system as set forth in claim 13, wherein said disabling means includes a filter means having a pass-band corresponding to a body resonant frequency to detect said signal component.

15. A height control system as set forth in claim 9, wherein said disabling means derives a variation speed of vehicular height on the basis of said sensor signal and detects vehicular height variation speed higher than a vehicular height variation speed criterion to disable said controller means.

16. A height control system as set forth in claim 15, wherein said disabling means is responsive to the vehicular height variation speed higher than said vehicular height variation speed criterion to disable said controller means for a given period of time.

17. A height control system as set forth in claim 16, wherein said disabling means includes a filter means having a pass-band corresponding to a vehicular body resonant frequency to detect said signal component.

18. A height control system for an automotive suspension system comprising:
a suspension system disposed between a vehicle body and a suspension member rotatably supporting a road wheel, said suspension system including means for varying a suspension force to be exerted between said vehicle body and said suspension member;
a first sensor monitoring a vehicular height for producing a height indicative sensor signal;
a controlling means for receiving said sensor signal, and checking the value of said sensor signal with respect to predetermined target height range indicative values for deriving a control signal to operate said suspension force varying means to adjust said suspension force for maintaining said vehicular height within said target height range; and
a disabling means being responsive to said height indicative sensor signal, said height indicate sensor signal being representative of a first road surface condition for causing relative cyclic displacement between said vehicle body and said suspension member having a peak of displacement the magnitude of which is greater than a first predetermined magnitude for disabling said controlling means until cyclic displacement disappears and responsive to said height indicative sensor signal, said height indicative sensor signal being representative of a second road surface condition causing relative displacement between said vehicle body and said suspension member in a magnitude greater than a second magnitude for disabling said controlling means for a given period of time.

19. A height control system for an automotive suspension system comprising:
a suspension system disposed between a vehicle body and a suspension member rotatably supporting a road wheel, said suspension system including means for varying suspension force to be exerted between said vehicle body and said suspension member;

a first sensor monitoring a vehicular height for producing a height indicative sensor signal;

a controlling means for receiving said sensor signal, and checking the value of said sensor signal with respect to a predetermined target height range indicative values for deriving a control signal to operate said varying means to adjust said suspension force for maintaining said vehicular height within said target height range; and a disabling means for extracting a signal component of said sensor signal representative of vehicular body vibration and thereby detecting vehicular body vibrating condition satisfying a predetermined first disabling condition for disabling said controlling means until said vehicular body vibration satisfying said first disabling condition is terminated, and detecting vehicular body vibrating condition satisfying a predetermined second disabling condition for disabling said controlling means for a given period of time.

20. A height control system for an automotive suspension system comprising:

a suspension system for disposed between a vehicle body and a suspension member rotatably supporting a road wheel, said suspension system including means for varying suspension force to be exerted between said vehicle body and said suspension member;

a first sensor monitoring a vehicular height for producing a height indicative sensor signal;

a controlling means for receiving said sensor signal, and checking the value of said sensor signal with respect to predetermined target height range indicative values for deriving a control signal to operate said varying means to adjust said suspension force for maintaining said vehicular height within said target height range; and a disabling means being responsive to said height indicative sensor signal, said height indicative sensor signal being representative of a first road surface condition for causing relative cyclic displacement between said vehicle body and said suspension member having an average magnitude of which is greater than a first predetermined magnitude for disabling said controlling means until cyclic displacement disappears and responsive to said sensor height indicative signal, said height indicative sensor signal being representative of a second road surface condition causing relative displacement between said vehicle body and said suspension member in a magnitude greater than a second magnitude which is greater than said first magnitude for disabling said controlling means for a given period of time.

21. A height control system for an automotive suspension system comprising:

a suspension system disposed between a vehicle body and a suspension member rotatably supporting a road wheel, said suspension system including means for varying suspension force to be exerted between said vehicle body and said suspension member;

a first sensor monitoring a vehicular height for producing a height indicative sensor signal;

a controlling means for receiving said sensor signal, and checking the value of said sensor signal with respect to a predetermined target height range indicative values for deriving a control signal to operate said varying means to adjust said suspension force for maintaining said vehicular height within said target height range; and a disabling means for detecting an undulated road surface condition causing cyclic relative displacement between said vehicle body and said suspension member on the basis of said sensor signal for disabling said controlling means until said undulation of said road surface terminates, and detecting a bottoming road surface condition causing bottoming in said suspension system for disabling said controlling means for a predetermined period of time.

* * * * *